(12) United States Patent
Ballard et al.

(10) Patent No.: US 7,963,559 B2
(45) Date of Patent: Jun. 21, 2011

(54) ROLL BAR WITH INTEGRATED LIGHTING

(75) Inventors: Claudio R. Ballard, Fort Lauderdale, FL (US); Gary Fulkerson, White Lake, MI (US); Jeff Seward, Fairfax, VT (US)

(73) Assignee: Claudio R. Ballard, Fort Lauderdale, FL (US)

( * ) Notice: Subject to any disclaimer, the term of this patent is extended or adjusted under 35 U.S.C. 154(b) by 142 days.

(21) Appl. No.: 12/397,461

(22) Filed: Mar. 4, 2009

(65) Prior Publication Data

US 2009/0273170 A1 Nov. 5, 2009

Related U.S. Application Data

(60) Provisional application No. 61/034,731, filed on Mar. 7, 2008.

(51) Int. Cl.
*B60R 21/13* (2006.01)

(52) U.S. Cl. ..... 280/756; 362/545; 362/459; 296/190.03

(58) Field of Classification Search ............. 280/756; 362/543, 382, 544, 545, 459, 487, 493, 249.01, 362/249.02, 249.05; 296/190.03
See application file for complete search history.

(56) References Cited

U.S. PATENT DOCUMENTS

| | | | | |
|---|---|---|---|---|
| 4,515,393 A * | 5/1985 | Sauter | | 280/756 |
| 4,747,636 A * | 5/1988 | Harasaki et al. | | 296/181.4 |
| 4,987,522 A * | 1/1991 | Miyano et al. | | 362/485 |
| 5,236,219 A * | 8/1993 | Jambor et al. | | 280/756 |
| 5,641,193 A * | 6/1997 | Zepnik et al. | | 296/107.09 |
| 5,702,150 A * | 12/1997 | Reuter et al. | | 296/180.1 |
| 5,899,521 A * | 5/1999 | Pfertner et al. | | 296/180.1 |
| 6,315,326 B1 * | 11/2001 | Muller et al. | | 280/756 |
| 6,669,275 B2 * | 12/2003 | Frasher et al. | | 296/203.02 |
| 7,097,233 B2 * | 8/2006 | Sogame et al. | | 296/180.1 |
| 7,140,667 B2 * | 11/2006 | Steinhauser et al. | | 296/181.2 |
| 7,341,278 B2 * | 3/2008 | Queveau et al. | | 280/756 |
| 7,387,414 B2 * | 6/2008 | Helms et al. | | 362/493 |
| 7,494,178 B2 * | 2/2009 | Nygaard | | 296/187.01 |
| 2002/0082750 A1 | 6/2002 | Lamke et al. | | |
| 2005/0128751 A1 * | 6/2005 | Roberge et al. | | 362/276 |
| 2005/0140129 A1 | 6/2005 | Miki et al. | | |
| 2005/0141225 A1 | 6/2005 | Striebel | | |
| 2005/0280253 A1 * | 12/2005 | Queveau et al. | | 280/756 |
| 2009/0161377 A1 * | 6/2009 | Helms et al. | | 362/493 |
| 2009/0207602 A1 * | 8/2009 | Reed et al. | | 362/225 |
| 2010/0079997 A1 * | 4/2010 | Morikawa et al. | | 362/249.01 |
| 2010/0128479 A1 * | 5/2010 | Biebl et al. | | 362/249.02 |

OTHER PUBLICATIONS

PCT: International Search Report of PCT/US09/36190 (related application); Jul. 15, 2009; 2 pgs.
PCT: Written Opinion of the International Searching Authority of PCT/US09/36190 (related application); Jul. 15, 2009; 5 pgs.

* cited by examiner

*Primary Examiner* — Ruth Ilan
*Assistant Examiner* — Karen A Beck
(74) *Attorney, Agent, or Firm* — Howison & Arnott, L.L.P.

(57) ABSTRACT

An internally illuminated roll bar has a W-shaped frame with "U" shaped cross-section with opposed side walls, a bottom wall and an open top, first and second outer legs, first and second inner legs, a lateral connecting member connecting the inner legs at the lower ends, one or more lenses for covering one or more portions of the rear side of the frame and discrete light sources mounted between the frame and the lenses wherein the some of the discrete light sources may be powered independently of others of the discrete light sources.

17 Claims, 5 Drawing Sheets

ROLL BAR WITH INTEGRATED LIGHTING

CROSS-REFERENCE TO RELATED APPLICATIONS

This application claims the benefit of U.S. Provisional Application for patent Ser. No. 61/034,731, filed Mar. 7, 2008, and entitled ROLL BAR WITH INTEGRATED LIGHTING, the specification of which is incorporated herein in its entirety by reference.

TECHNICAL FIELD

The following disclosure relates to a roll bar for automotive applications and, in particular, an internally illuminated roll bar.

BACKGROUND

Many modern vehicles such as automobiles, trucks and off-the road vehicles are provided with frame built in or around the passenger compartment of the vehicle to protect occupants from being injured in an accident, particularly in an accident where the vehicle rolls over. Typically, a roll bar is a single bar behind and above the driver's seat that provides roll-over protection. A roll bar may be a particularly desirable feature in high performance automobiles, trucks and off road vehicles. A roll bar may also be a desirable feature in a convertible-type automobile due to the lack of a rigid roof structure in such vehicles.

Most, if not all, modern vehicles have a lighting system that include signaling and lighting devices mounted to the front, sides and rear of the vehicle. The purpose of these systems is to provide illumination for the driver to operate the vehicle safely after dark, to increase the conspicuity of the vehicle, and to display information about the vehicle's presence, position, size, direction of travel, and driver's intentions regarding direction and speed of travel. Lighting systems mandated by government regulations typically include head lights, tail lights, vehicle turn signals, brake lights and backup lights. Turn signals are lights mounted near the left and right front and rear corners of a vehicle, are actuated by a vehicle operator to indicate a turn or a lane change. Tail lights, located at the rear of a vehicle, serve to make other drivers aware of the presence of a vehicle in front of them after dark. Brake lights, actuated when an operator applies the vehicle's brakes, indicate that the vehicle is slowing down or stopping.

However, there still exists a need for improved vehicle lighting systems that are more visible and conspicuous. This is especially true in the case of smaller, high performance vehicles that have a low profile. Consequently, in view of the desirability of roll bars in such vehicles plus the need for better and more conspicuous lighting systems, there exists a need for a vehicle roll bar that incorporates components of the vehicle lighting system.

SUMMARY

In one aspect thereof, an internally illuminated roll bar is disclosed. The frame of the roll bar has a "U" shaped cross-section with opposed side walls, a bottom wall and an open top. The bottom wall comprises a plurality of "X" shaped first cross members and a plurality of straight cross members positioned between the "X" shaped cross members. The frame has first and second outer legs, first and second inner legs, with arcuate head portions connecting the inner and outer legs at the upper ends. A lateral connecting member connects the inner legs at the lower ends thereof. The inner legs are shorter than the outer legs. One or more covers enclose a front side of the frame and match the longitudinal profile of the frame. The roll bar includes one or more lenses for covering one or more portions of the rear side of the frame, the lenses being formed from a transparent or translucent light conducting material and configured to match at least a portion of the profile of the frame. Discrete light sources mounted between the frame and the lenses of the light sources may be powered independently of others of the discrete light sources.

In another aspect, a vehicle lighting system includes an internally illuminated roll bar having a W-shaped end-to-end profile. In one embodiment, the roll bar has a frame with a generally "U" shaped cross-section including opposed side walls, a bottom wall and an open side. The bottom wall may include, at least in part, a plurality of "X" shaped first cross members and a plurality of straight cross members positioned between the "X" shaped cross members.

The frame may have first and second outer legs, first and second inner legs, and arcuate head portions connecting the inner and outer legs at upper ends of the legs. A lateral connecting member connects the inner legs at lower ends thereof with the inner legs being shorter than the outer legs. One or more covers matching the longitudinal profile of the frame cover the front side of the frame. The illuminated roll bar, in one variation, includes lenses formed from a transparent or translucent light conducting material that cover rearward portions of the frame with a plurality of discrete light sources mounted between the frame and the lenses. In one embodiment, at least some of the light sources may be powered independently of others of the discrete light sources. The discrete light sources may be mounted on a substrate such as a circuit board and controlled with one or more manual switches and/or a microprocessor. In one embodiment, the discrete light sources are colored, e.g. red, green, blue and white light emitting diodes that may be independently powered to illuminate portions of the roll bar with different colors.

BRIEF DESCRIPTION OF THE DRAWINGS

For a more complete understanding, reference is now made to the following description taken in conjunction with the accompanying Drawings in which.

DETAILED DESCRIPTION

Figure 1:
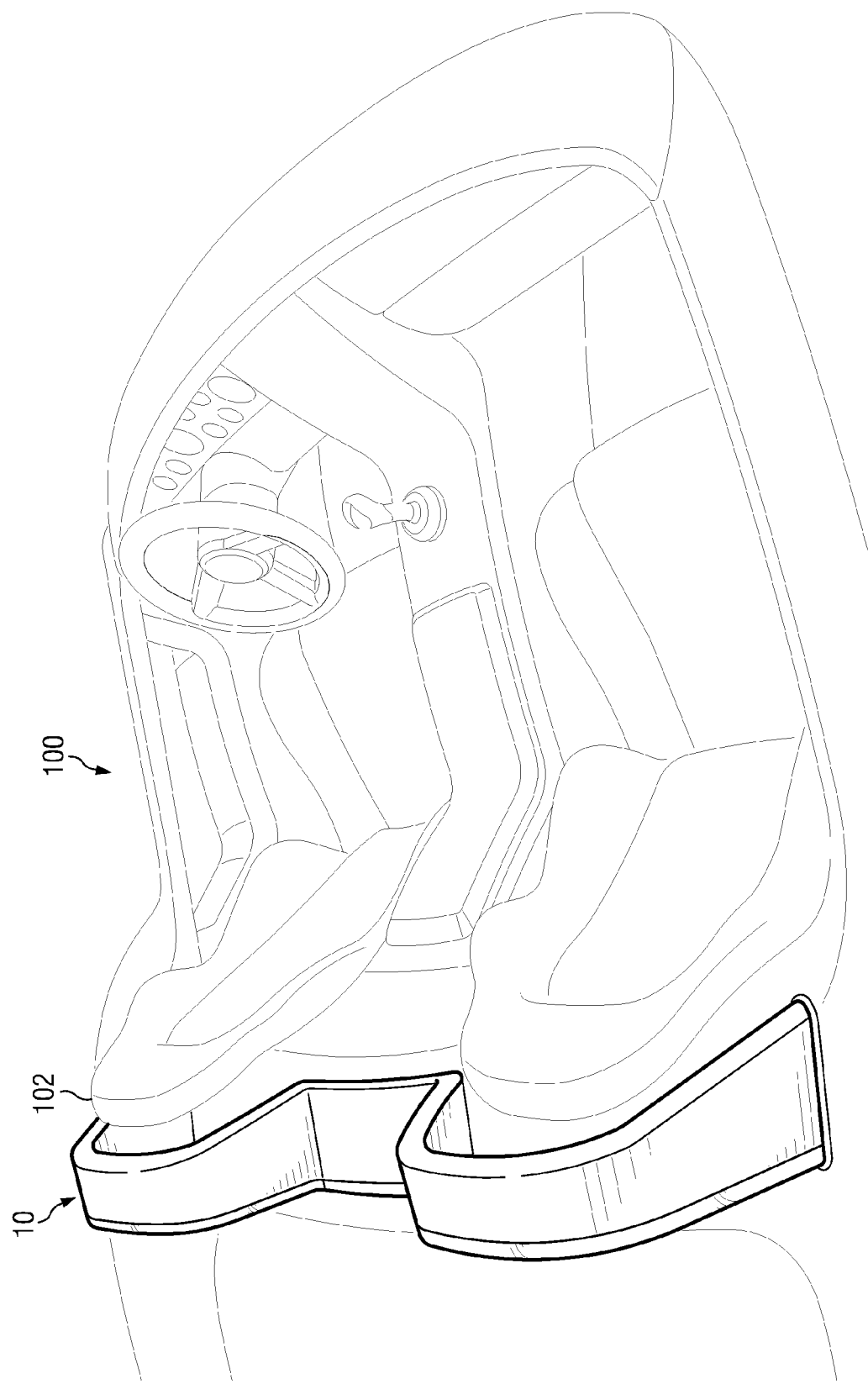
FIG. 1 is a partial perspective view of a roll bar according to the present disclosure.

Referring now to the drawings, wherein like reference numbers are used herein to designate like elements throughout, the various views and embodiments of a roll bar with integrated lighting. The figures are not necessarily drawn to scale, and in some instances the drawings have been exaggerated and/or simplified in places for illustrative purposes only.

One of ordinary skill in the art will appreciate the many possible applications and variations based on the following examples of possible embodiments.

FIG. 1 is a partial perspective view of an internally illuminated roll bar 10 according to the disclosure mounted on a two-seat, roadster style automobile. As illustrated, roll bar 10 is mounted behind the seats 102 of the automobile and has a longitudinal profile including portions that conform to the profile of the upper portions of the seats. Roll bar 10 presents an aesthetically pleasing design while providing the functionality of roll over protection for the occupants of the vehicle.

Figure 2:
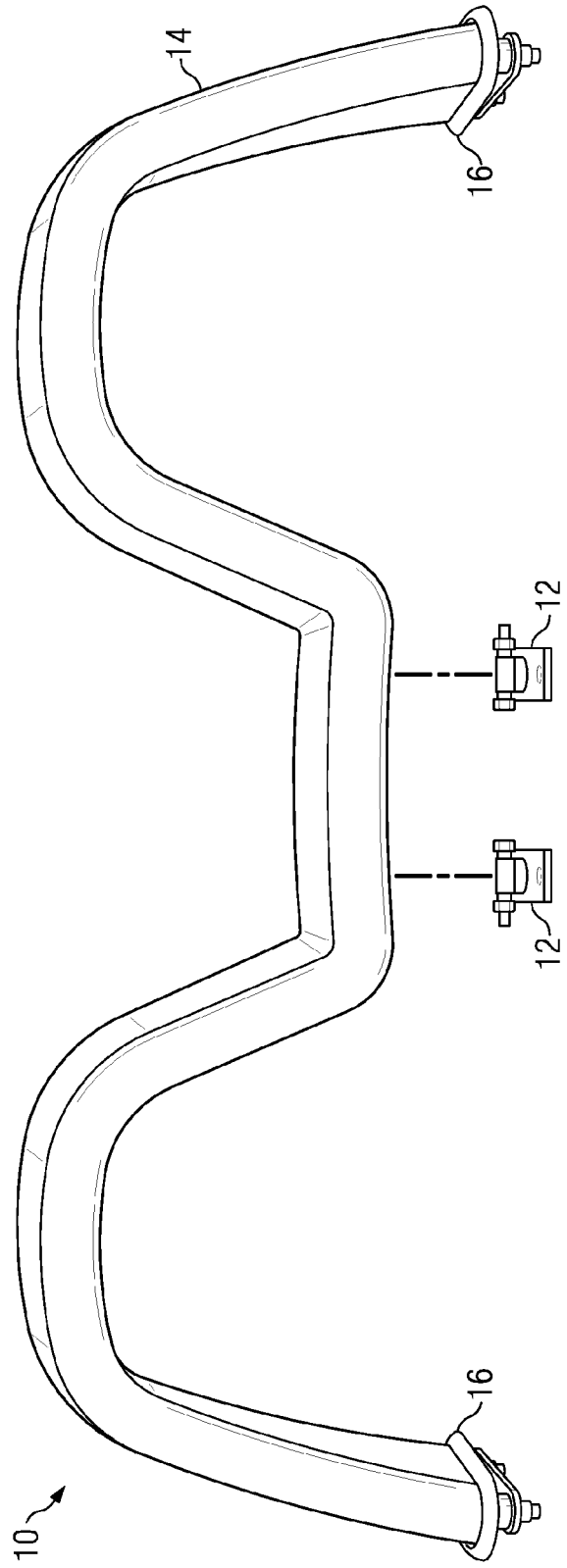
FIG. 2 is a front view of the internally illuminated roll bar of FIG. 1.

FIG. 2 is a front view of internally illuminated roll bar 10. As shown, roll bar 10 includes one or more front covers 14 formed from a suitable material such as a molded rigid plastic or formed metal sheet. Covers 14 may be formed as a single molded piece or alternatively may be formed from a plurality of molded or formed panels 18. A pair of mounting brackets 12 are provided for mounting roll bar 10 at attachment points between the seats of the vehicle. Roll bar 10 includes a mounting fixture or trim fixture 16 at each end of the roll bar for aesthetic appearance purposes.

Figure 3:
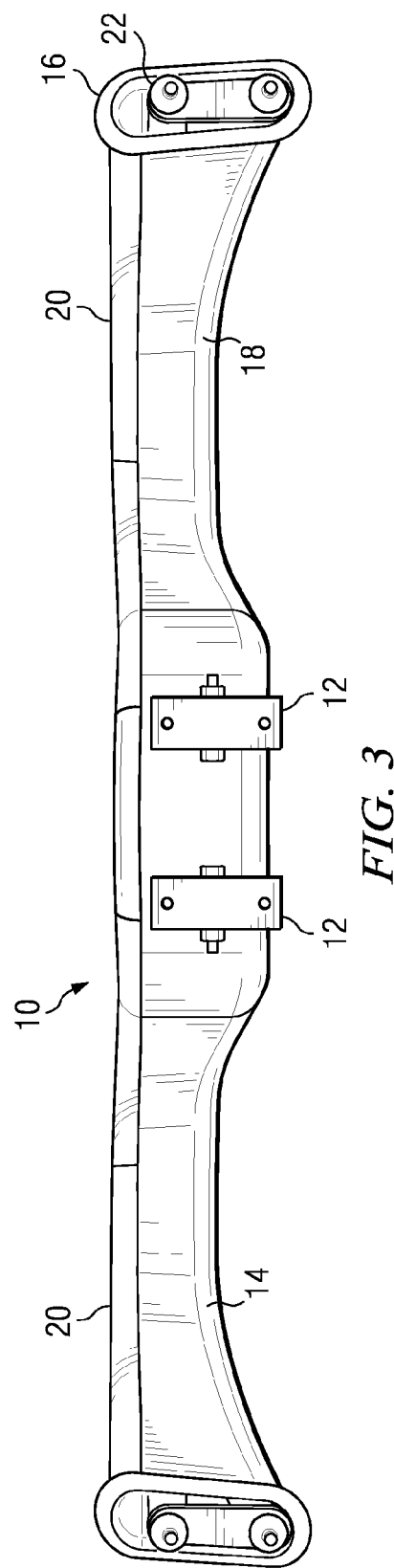
FIG. 3 is a bottom view of the internally illuminated roll bar of FIG. 1.

FIG. 3 is a bottom view of internally illuminated roll bar 10. In one embodiment, roll bar 10 includes one or more rearwardly facing lenses 20. Lenses 20 conform to the profile of roll bar 10, and are configured to enclose portions of the roll bar frame 44 (FIG. 7) not covered by covers 16. Lenses 20 are formed from an appropriate transparent or translucent light transmitting material such as a transparent or translucent plastic. Some or all of an interior surface of the transparent or translucent material may be formed so as to be reflective to external light, i.e., light coming from outside the roll bar assembly. As illustrated, one or more internal conduits 22 may be provided for housing electrical wires or electrical leads to power discrete light sources within lenses 20. In other embodiments, roll bar 10 may incorporate one or more forward facing lenses 20.

Figure 4:
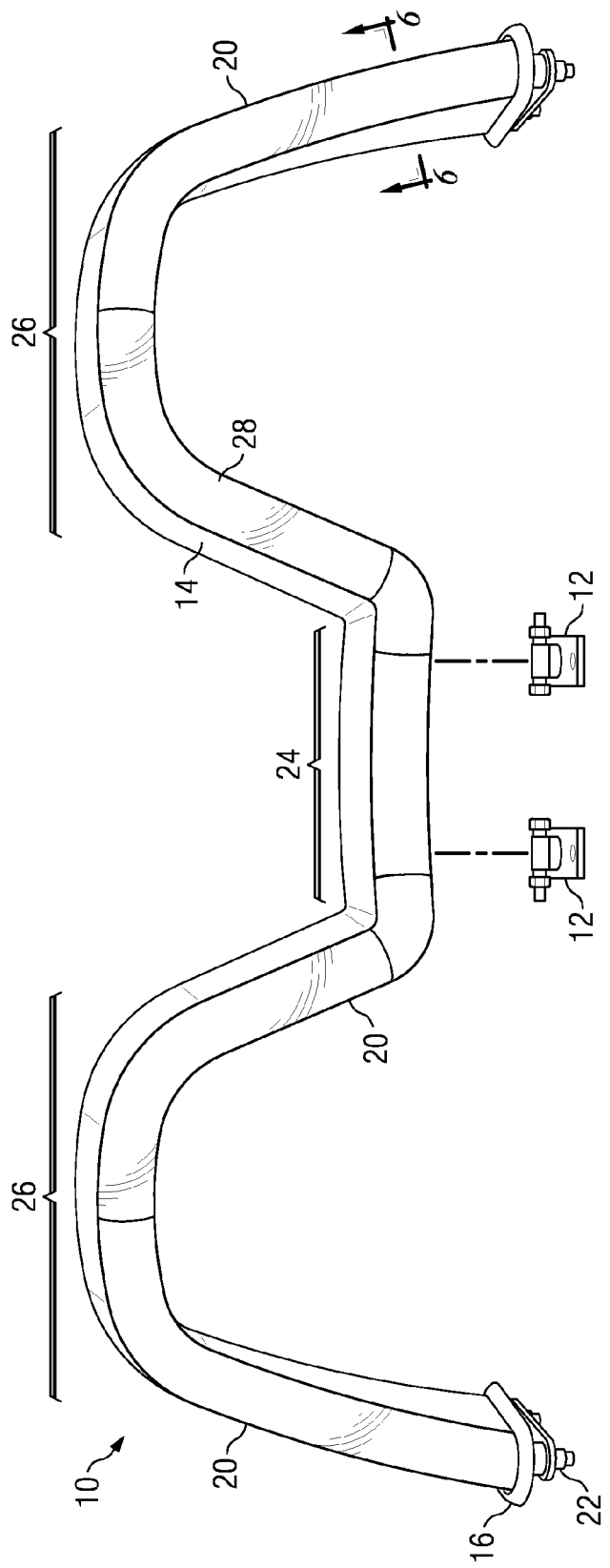
FIG. 4 is a rear view of the internally illuminated roll bar of FIG. 1.

FIG. 4 is a rear view of internally illuminated roll bar 10. As illustrated, roll bar 10 may have a longitudinal, i.e., end-to-end profile resembling an inverted W with an elongated center section 24 connecting two outer inverted U-shaped sections 26. In the embodiment illustrated in FIG. 4, lenses 20 cover the U-shaped outer sections 26 of roll bar 10. In one embodiment, lenses 20 may be a single molded or formed piece or alternatively may include a plurality of lens panels 28. In other embodiments, lenses 20 may cover more or less of roll bar 10 or may cover different portions of the roll bar. It is, however, anticipated that at least the outermost portions of U-shaped sections 26 will be covered by lenses 20.

Figure 5:
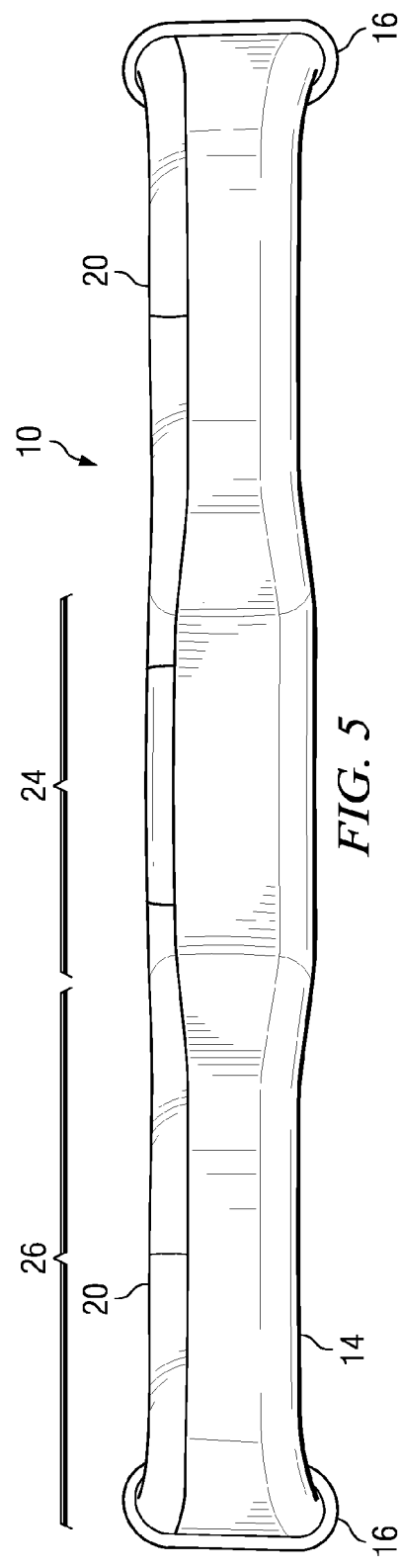
FIG. 5 is a top view of the illuminated roll bar of FIG. 1.

FIG. 5 is a top view of illuminated roll bar 10. As shown, the width of the roll bar changes along its length with the center section 24 having a wider profile than outer sections 26.

Figure 6:
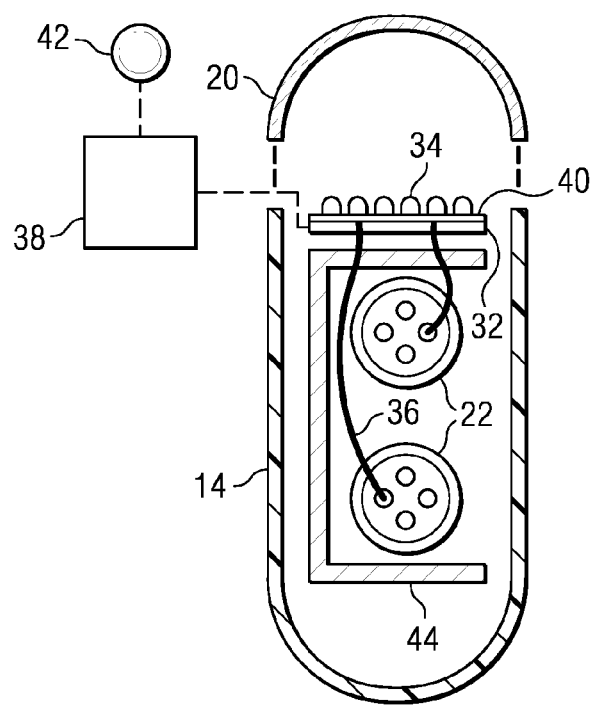
FIG. 6 is a partial cross-sectional view of the roll bar of FIG. 1 taken along line 6-6 of FIG. 4.

FIG. 6 is a cross-sectional view of the roll bar 10 taken along line 6-6 of FIG. 4. In one embodiment, internally illuminated roll bar 10 includes a plurality of discrete light sources 34 mounted on a circuit board 32 within the roll bar 10. Alternatively, discrete light sources 34 may be mounted on a flexible substrate (i.e., tape) containing conductors or directly on frame 44 of roll bar 10. Discrete light sources 34 may comprise light emitting diodes (LED) or alternatively a plurality of conventional incandescent lights. Power for discrete light sources 34 is provided by means of electrical leads 36 that may pass through conduits 22 within roll bar 10. In one embodiment, discrete light sources 34 may be a plurality of different colored LEDs, e.g., LEDs that emit red, blue, green and white colored light mounted in clusters or linear arrays on circuit board 32. A reflective panel 40 may be provided to direct the light emitted by discrete light sources 34 toward lens 20. The operation of discrete light sources 34 may be controlled by means of a manual switch 42 and/or a microprocessor or microcontroller 38 to provide the desired illumination of the discrete light sources. In another variation, the operation is controlled by the vehicle's on-board computer.

In one variation, discrete light sources 34 may be selectively illuminated on either side or end of roll bar 10 to serve as, or in conjunction with, vehicle turn signals to signal a turn. In another embodiment, discrete light sources 34 may be controlled to illuminate a selected light sources 34 to serve as, or in conjunction with tail lights. In yet another embodiment, a plurality of discrete light sources 34 may be illuminated to serve as backup lights for the vehicle. In the case where discrete light sources 34 are illuminated to serve as back up lights for a vehicle, the discrete light sources 34 are preferably white LEDs or a combination of colored LEDs that produce a white or close to white light. In yet another embodiment, discrete light sources 34 may be utilized to serve as emergency warning lights in which case some or all of discrete light sources 34 would be powered intermittently to achieve a flashing effect.

In one embodiment, lens 20 may be formed entirely from one or more panels of a completely transparent material. In other embodiments, portions of lens 20 may be formed from tinted transparent materials or tinted translucent materials. In yet other embodiments, different portions of lens 20 may be transparent, tinted transparent, translucent, or formed from a translucent white material. In embodiments where discrete light sources 34 comprise colored LEDs, different color configurations of lens 20 may be utilized with different color configurations of discrete light sources 34 to achieve a multitude of different effects including turn signals, running lights, emergency flashers and back up lights.

Figure 7:
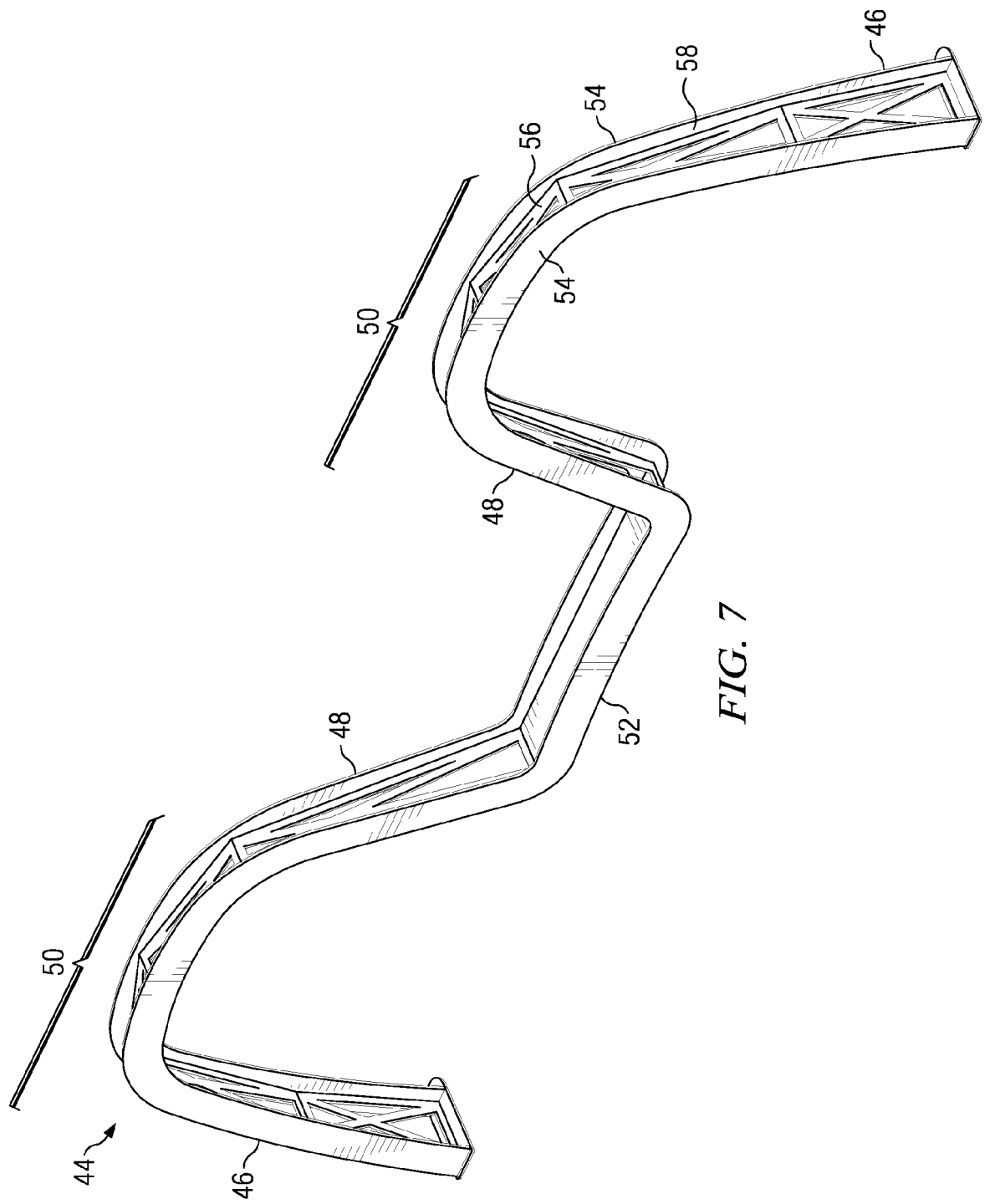
FIG. 7 is a perspective view of a frame for the internally illuminated roll bar of FIG. 1.

FIG. 7 is a perspective view of a frame 44 for internally illuminated roll bar 10. In one variation, frame 44 includes outer legs 46, inner legs 48 and arcuate head portions 50. A lateral connecting member 52 extends between inner legs 48. Frame 44 may be fabricated from a suitable material such as aluminum, steel, a high strength plastic or a high strength fiberglass depending on the particular design.

Figure 8:
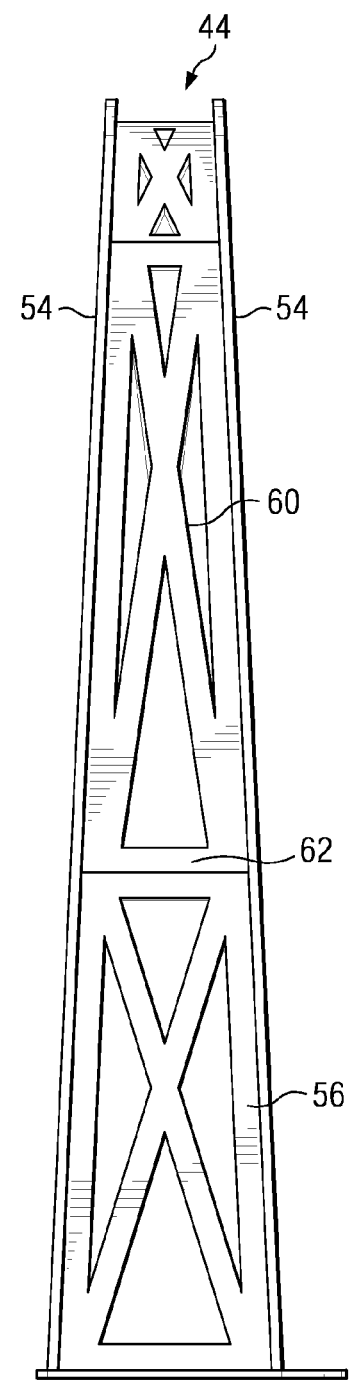
FIG. 8 is a side view of the frame of the roll bar of FIG. 7.

FIG. 8 is a side view of frame 44 of roll bar 10. Frame 44 has a generally U-shaped cross section with opposed sidewalls 54, a bottom wall 56, and an open side 58. In the illustrated embodiment, bottom wall 56 of the outer legs 46, inner legs 48 and head portion 50 comprises a plurality of X-shaped cross members 60 separated by lateral cross members 62. In one embodiment, bottom wall 56 of lateral connecting member 52 is formed as a solid wall as shown in FIG. 7.

It will be appreciated by those skilled in the art having the benefit of this disclosure provides a roll bar with integrated lighting. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An internally illuminated roll bar comprising:
   a frame having a generally "U" shaped cross-section with opposed side walls, a bottom wall and an open side;
   the frame having first and second outer legs, first and second inner legs, with arcuate head portions connecting the inner and outer legs at upper ends thereof, and a lateral connecting member connecting the inner legs at lower ends thereof;
   one or more covers for covering a front side of the frame; the one or more covers matching the longitudinal profile of the frame
   one or more lenses for covering one or more portions of the rear side of the frame, the lenses being formed from a transparent or translucent light conducting material and configured to match at least a portion of the profile of the frame; and
   a plurality of discrete light sources mounted between the frame and the lenses wherein at least some of the discrete light sources may be powered independently of others of the discrete light sources.

2. The internally illuminated roll bar of claim 1 wherein the discrete light sources comprise light emitting diodes.

3. The internally illuminated roll bar of claim 2 wherein the light emitting diodes include one or more of red, green, blue and white light emitting diodes and wherein the different colored diodes may be independently powered to illuminate portions of the roll bar with different colors.

4. The internally illuminated roll bar of claim 1 wherein at least some of the discrete light sources may be intermittently powered on a side of the roll bar to indicate a vehicle turn.

5. The internally illuminated roll bar of claim 1 wherein at least some of the discrete light sources may be powered across or on both ends of the roll bar to serve as vehicle tail lights or in conjunction with vehicle tail lights.

6. The internally illuminated roll bar of claim 1 wherein at least some of the discrete light sources may be powered across or on ends of the roll bar to serve as back up lights.

7. The internally illuminated roll bar of claim 1 wherein the bottom wall further comprises a plurality of "X" shaped first cross members and a plurality of straight cross members positioned between the "X" shaped cross members.

8. The internally illuminated roll bar of claim 1 wherein the inner legs of the frame are shorter than the outer legs of the frame.

9. A vehicle lighting system comprising:
   an internally illuminated roll bar having a W-shaped end-to-end profile, the internally illuminated roll bar including:
      a frame having a generally "U" shaped cross-section with opposed side walls, a bottom wall and an open side, the bottom wall comprising at least in part a plurality of "X" shaped first cross members and a plurality of straight cross members positioned between the "X" shaped cross members;
      the frame having first and second outer legs, first and second inner legs, with arcuate head portions connecting the inner and outer legs at upper ends thereof, and a lateral connecting member connecting the inner legs at lower ends thereof and wherein the inner legs are shorter than the outer legs;
      one or more covers for covering a front side of the frame; the one or more covers matching the longitudinal profile of the frame
      one or more lenses for covering one or more portions of the frame, the lenses being formed from a transparent or translucent light conducting material and configured to match at least a portion of the profile of the frame; and
      a plurality of discrete light sources mounted between the frame and the lenses wherein at least some of the discrete light sources may be powered independently of others of the discrete light sources.

10. The vehicle lighting system of claim 9 further comprising a circuit board mounted in the roll bar with a plurality of discrete light sources mounted on the circuit board.

11. The vehicle lighting system of claim 10 wherein the discrete light sources comprise one or more of red, green, blue and white light emitting diodes and wherein the different colored diodes may be independently powered to illuminate portions of the roll bar with different colors.

12. The vehicle lighting system of claim 10 further comprising a microprocessor for controlling the discrete light sources.

13. The vehicle lighting system of claim 10 further comprising a manually operated switch for controlling the discrete light sources.

14. The vehicle lighting system of claim 10 wherein at least some of the discrete light sources may be intermittently powered on a side of the roll bar to indicate a vehicle turn.

15. The vehicle lighting system of claim 10 wherein at least some of the discrete light sources may be powered across or on both ends of the roll bar to serve as vehicle tail lights or in conjunction with vehicle tail lights.

16. The vehicle lighting system of claim 10 wherein at least some of the discrete light sources may be powered across or on ends of the roll bar to serve as back up lights.

17. The vehicle lighting system of claim 10 further comprising a pair of mounting brackets for connecting the illuminated roll bar to attachment points between seats of a vehicle.

* * * * *